(12) United States Patent  
van Waasen et al.

(10) Patent No.: US 8,279,913 B2
(45) Date of Patent: Oct. 2, 2012

(54) CONFIGURABLE TRANSCEIVER

(75) Inventors: Stefan van Waasen, Kolbermoor (DE); Martin Simon, Otterfing (DE)

(73) Assignee: Intel Mobile Communications GmbH, Neubiberg (DE)

(*) Notice: Subject to any disclaimer, the term of this patent is extended or adjusted under 35 U.S.C. 154(b) by 852 days.

(21) Appl. No.: 12/051,789

(22) Filed: Mar. 19, 2008

(65) Prior Publication Data

US 2009/0238249 A1 Sep. 24, 2009

(51) Int. Cl.
*H04B 1/38* (2006.01)
*H04L 27/26* (2006.01)

(52) U.S. Cl. ......... 375/219; 375/260; 375/295; 375/316

(58) Field of Classification Search .......... 375/219–220, 375/222, 259–260, 267; 455/73, 78, 84, 455/132, 168.1, 176.1, 180.1, 272, 552.1, 455/562.1; 275/219–220, 222, 259–260, 275/267, 295, 316
See application file for complete search history.

(56) References Cited

U.S. PATENT DOCUMENTS

| | | | | |
|---|---|---|---|---|
| 5,881,369 A * | 3/1999 | Dean et al. | | 455/78 |
| 6,029,052 A * | 2/2000 | Isberg et al. | | 455/131 |
| 6,516,184 B1 * | 2/2003 | Damgaard et al. | | 455/86 |
| 6,970,681 B2 * | 11/2005 | Darabi et al. | | 455/73 |
| 7,003,265 B2 * | 2/2006 | Jeon et al. | | 455/73 |
| 7,092,676 B2 * | 8/2006 | Abdelgany et al. | | 455/76 |
| 7,133,646 B1 * | 11/2006 | Miao | | 455/73 |
| 7,526,018 B2 * | 4/2009 | Seo et al. | | 375/219 |
| 7,643,848 B2 * | 1/2010 | Robinett | | 455/552.1 |
| 7,940,751 B2 * | 5/2011 | Hansen | | 370/354 |
| 7,941,102 B2 * | 5/2011 | Kerth et al. | | 455/75 |
| 8,095,099 B2 * | 1/2012 | Patel et al. | | 455/183.1 |
| 2003/0193923 A1 * | 10/2003 | Abdelgany et al. | | 370/342 |
| 2005/0159180 A1 * | 7/2005 | Cheng et al. | | 455/552.1 |
| 2005/0227631 A1 * | 10/2005 | Robinett | | 455/83 |
| 2005/0277436 A1 * | 12/2005 | Lai et al. | | 455/552.1 |
| 2006/0083195 A1 * | 4/2006 | Forenza et al. | | 370/328 |
| 2006/0084469 A1 * | 4/2006 | Malone et al. | | 455/552.1 |
| 2006/0276158 A1 * | 12/2006 | Okabe | | 455/333 |
| 2007/0082622 A1 * | 4/2007 | Leinonen et al. | | 455/78 |
| 2007/0105505 A1 * | 5/2007 | Crocker et al. | | 455/78 |
| 2008/0151845 A1 * | 6/2008 | Jaakkola et al. | | 370/338 |
| 2008/0293446 A1 * | 11/2008 | Rofougaran | | 455/552.1 |
| 2009/0190633 A1 * | 7/2009 | Smith | | 375/148 |

* cited by examiner

*Primary Examiner* — Lawrence B Williams

(74) *Attorney, Agent, or Firm* — Eschweiler & Associates, LLC

(57) ABSTRACT

A system is disclosed for operating a plurality of receiver paths and/or a plurality of transmitter paths in a single mode or multiple mode configuration.

19 Claims, 4 Drawing Sheets

CONFIGURABLE TRANSCEIVER

BACKGROUND

A typical multiple-input multiple-output (MIMO) transceiver system, such as that used in mobile communications, has a plurality of antennas both for transmission and reception. For example, a typical system may have four transmission antennas and/or four reception antennas. The antennas may all be operated in parallel, simultaneously, which allows an increased data rate for a given mode over other systems.

The steadily increasing number of wireless systems and applications requires increasingly complex MIMO systems to improve link quality and data rate. Moreover, consumer demand and other requirements are increasing the number of potential modes in which a given device can operate. Some exemplary types of modes may include a Global System for Mobile communications (GSM) mode, a Universal Mobile Telecommunications System (UMTS) mode, a Third Generation Partnership Project Long Term Evolution (3GPP LTE) mode, a Worldwide Interoperability for Microwave Access (WiMax) mode, a Wireless Local Area Network (WLAN) mode, a Bluetooth (BT) mode, and so forth.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

At least one implementation described herein includes a system for transmitting and/or receiving wireless signals within a single mode or multiple modes using one or more channels. The system may have multiple paths, including multiple receiving (RX) paths and multiple transmitting (TX) paths. At least one implementation described herein includes a transceiver system that is configured to select between multimode and/or single mode operation. Control logic may be utilized to select between the operating scenarios. For example, given three paths, the control logic may select between operating the three paths in three different modes; two paths in two different modes with the third path being operated in the same mode as one of the other paths, but on a different channel; or the three paths could be operated in the same mode on one or more channels, thereby increasing the transmission rate of that particular mode. Additionally, the TX and RX paths could be configured independently. For example, two RX paths could be operated in two different modes while two TX paths could be operated in a single mode using one or more spatial channels with the same frequency.

According to another implementation, an exemplary method is described that includes determining a number of modes to be used in a wireless communication environment, configuring the paths in a transceiver system for single mode or multiple mode operation, and transmitting or receiving one or more wireless signals utilizing the transceiver system.

Exemplary Environment

Figure 1:
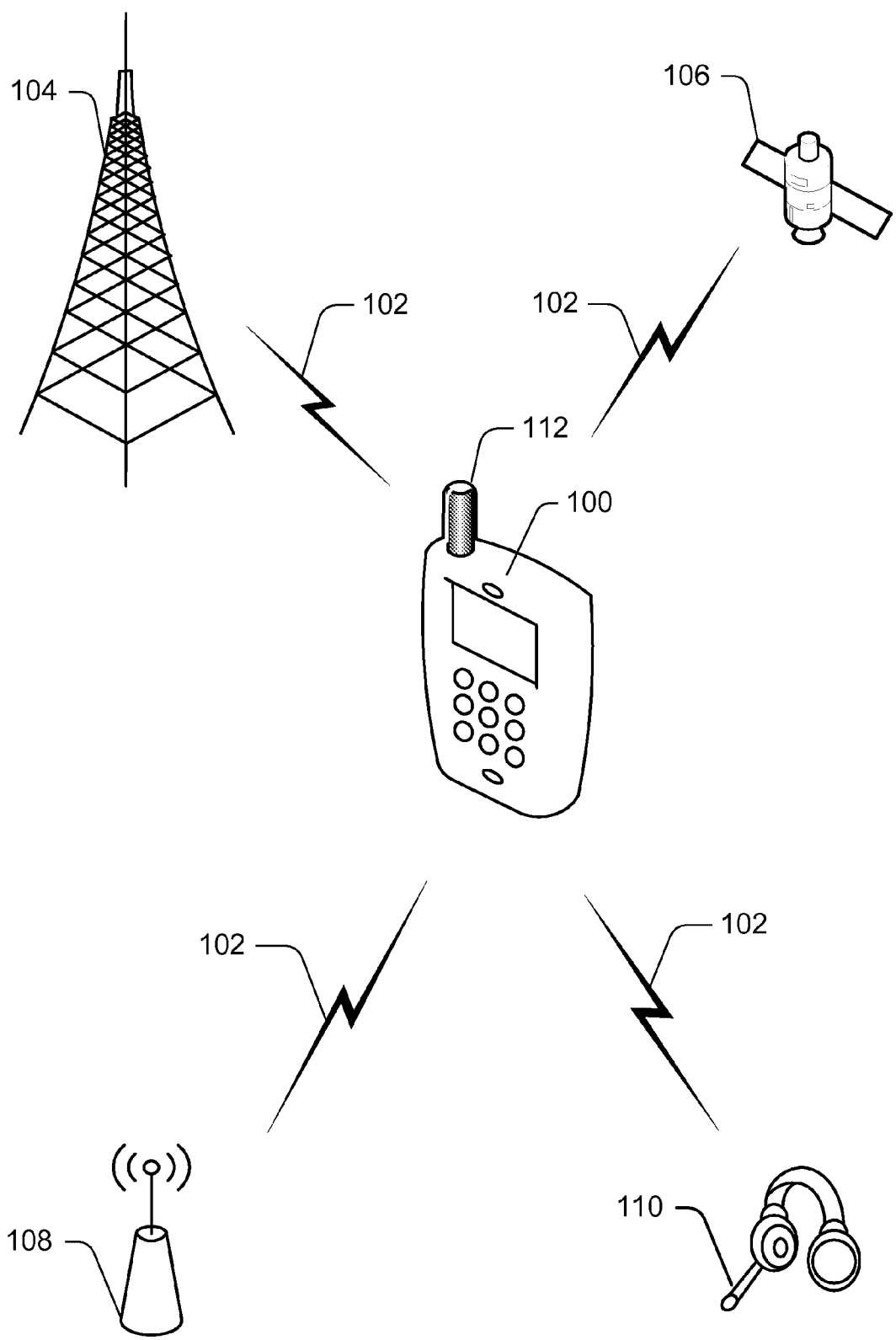
FIG. 1 shows an exemplary mobile device operable to wirelessly communicate with various communication devices through a variety of modes.

FIG. 1 shows a wireless device 100 that is operable to send and receive signals 102 in multiple modes. The multiple modes, e.g., GSM, UMTS, and so forth, may be utilized for communication with communications points such as a base station 104, a satellite 106, a wireless access point (WAP) 108, Bluetooth (BT) headset 110, and/or other commutation devices through the use of wireless signals 102, which may be, for example, radio signals.

The wireless device 100 may be cellular phone, wireless media device, or other device capable of receiving and/or transmitting a radio or other wireless signal 102. For example, the wireless device 100 may be a personal digital assistant (PDA), a portable computing device capable of wireless communication, a media player device, a portable gaming device, a personal computer, a wireless access point (WAP) and/or any other suitable device.

The wireless device 100 includes one or more antennas 112 that may be configured for communication with the base station 104, satellite 106, WAP 108, BT headset 110, and so forth. For example, the wireless device 100 may communicate using a GSM or UMTS mode with the base station 104 as part of a cellular network, in which the base station 102 represents a cellular phone tower or other device capable of transmitting and/or receiving one or more radio or other wireless signals 102 within a cell of a cellular network. The wireless device 100 may also communicate with the BT headset 110 using a BT mode for transmitting and receiving. The wireless device 100 may additionally or alternatively communicate with other communication points using one or more antennas 112, which may be configured as a multimode (MM)/multiple-input multiple-output (MIMO)/multiple-input single-output (MISO), and/or single-input multiple-output (SIMO) system to transmit and/or receive one or more signals 102 in one or more modes.

Exemplary System

Figure 2:
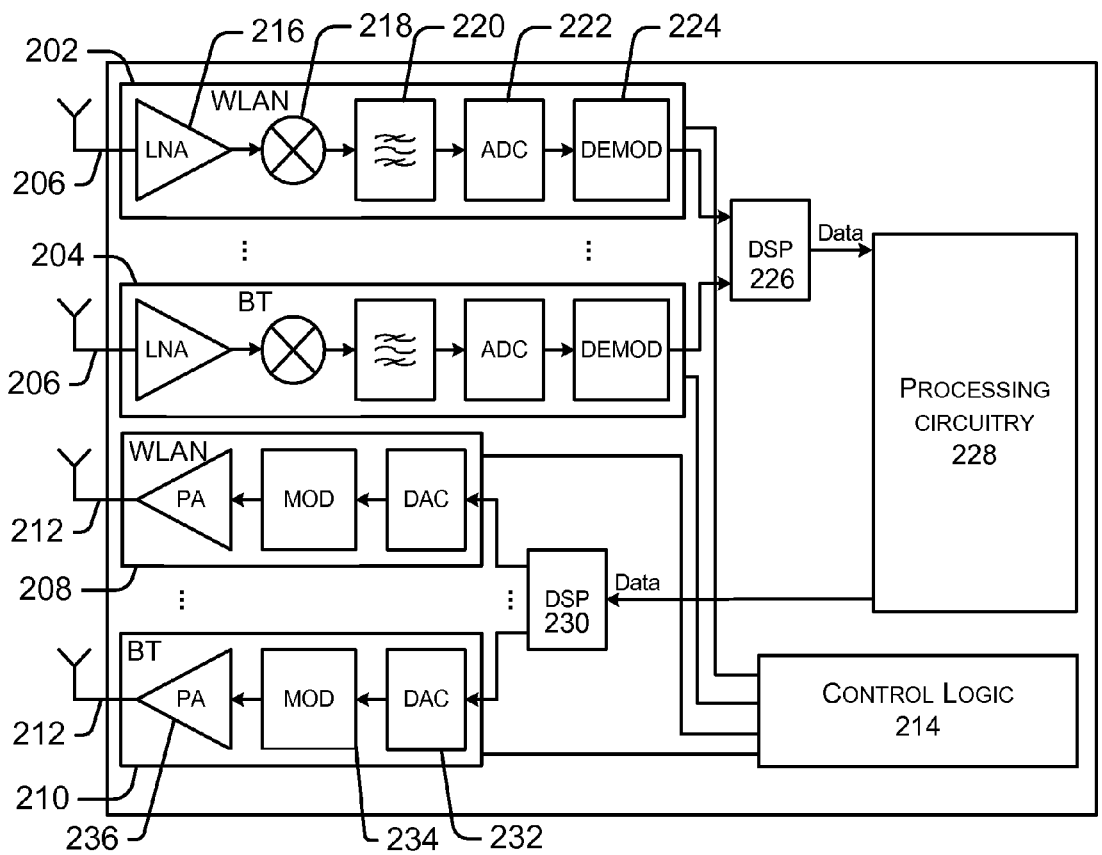
FIG. 2 shows a schematic circuit diagram of an exemplary system having a transceiver structure and being operated in a multiple mode operation.

FIG. 2 shows an example of a transceiver system 200 for transmitting and receiving wireless signals, such as radio signals. Exemplary transceiver system 200 may be part of a mobile communications device, such as device 100. As shown in FIG. 2, the transceiver system 200 is configured to operate in multiple modes for the transmission and reception paths. More particularly, FIG. 2 shows a single input single output (SISO) configuration for each mode.

Paths 202 and 204 may be configured as reception (RX) paths to receive signals using a receiving antenna 206 or other similar receiving mechanism, such as antenna 112. RX path 202 is shown to be configured for receiving WLAN signals. RX path 204 is shown to be configured for receiving BT signals. Of course, this configuration is illustrative only and paths 202 and 204 may be configured to operate in other communication modes.

Paths 208 and 210 may be configured as transmission (TX) paths to transmit signals using a transmission antenna 212 or other similar transmission mechanism, such as antenna 112. TX path 208 is shown to be configured for transmitting WLAN signals. TX path 210 is shown to be configured for transmitting BT signals. Of course, this configuration is illustrative only and paths 208 and 210 may be configured to operate in other communication modes.

The RX and TX paths may be configured for any of a number of modes (GSM, UMTS, 3GPP LTE, WiMax, WLAN, BT, and so forth) using control logic 214. The control logic 214 may send instructions to, or may physically or electronically manipulate, paths 202, 204, 208 and 210 in order to configure the paths for a particular mode based on availability, user preference, system optimization, and so forth.

RX paths 202 and 204 and TX paths 208 and 210 may be used as examples for describing the manner in which system 200 may be configured for multiple mode operation. Consider the example in which system 200 receives a BT signal and a WLAN signal at approximately the same moment. The control logic 214 configures paths 202 and 204 for WLAN and BT operation, respectively. This may be accomplished by tuning one or more components within either or both of the paths. For example, path 202 is shown to include a Low Noise Amplifier (LNA) 216, a mixer 218, a filter 220, an Analog to Digital Converter (ADC) 222 and a demodulator 224. Any or all of these components may be tuned to handle the incoming WLAN signal prior to sending output to the Digital Signal Processor (DSP) 226. The DSP 226 may, in turn, generate and send data to processing circuitry 228 or other components of the system 200. Path 204 may have similar components to path 202 and may be configured or tuned to receive and process signals in a BT band or mode. Thus, BT and WLAN signals may be received and processed simultaneously, independently, and/or in parallel.

Data may be sent from processing circuitry 228 or other components of the system 200 to a DSP 230, which may receive and process signals for WLAN and BT transmission to paths 208 and 210, respectively. The signal output by the DSP 230 may be processed using a Digital to Analog converter (DAC) 232, a modulator 234, and a power amplifier (PA) 236 prior to being transmitted using antenna 212. Thus, according to this configuration, WLAN and BT signals may be processed and/or transmitted simultaneously, independently, and/or in parallel, allowing system 200 to operate in multiple modes at the same time. Thus, for example, a user may access the Internet and interact with a Bluetooth headset essentially simultaneously.

FIG. 2 shows control logic 214 connected generally to paths 202, 204, 208, and 210. However, one skilled in the art will appreciate that this configuration is for simplicity of discussion. The control logic 214 may in fact be connected to each component (e.g. 216, 218, 232, etc) in order to configure each component in the path for the relevant mode. For example, when switching path 202 from a WLAN operation mode to a BT operation mode, one or more of the components may be reconfigured to accommodate the different bandwidth, compression, and other characteristics of the different mode. This may be accomplished by modifying the gain and/or current characteristics of the LNA 216, the mixer 218 and/or other components of the path, modifying the bandwidth of the filter 220, modifying the resolution of the ADC 222, and/or other modifications of the components of path 202 to switch between operating modes. Of course, similar reconfigurations may be made with regard to paths 204, 208, and 210 to similarly reconfigure those paths for a given mode of operation.

Figure 3:
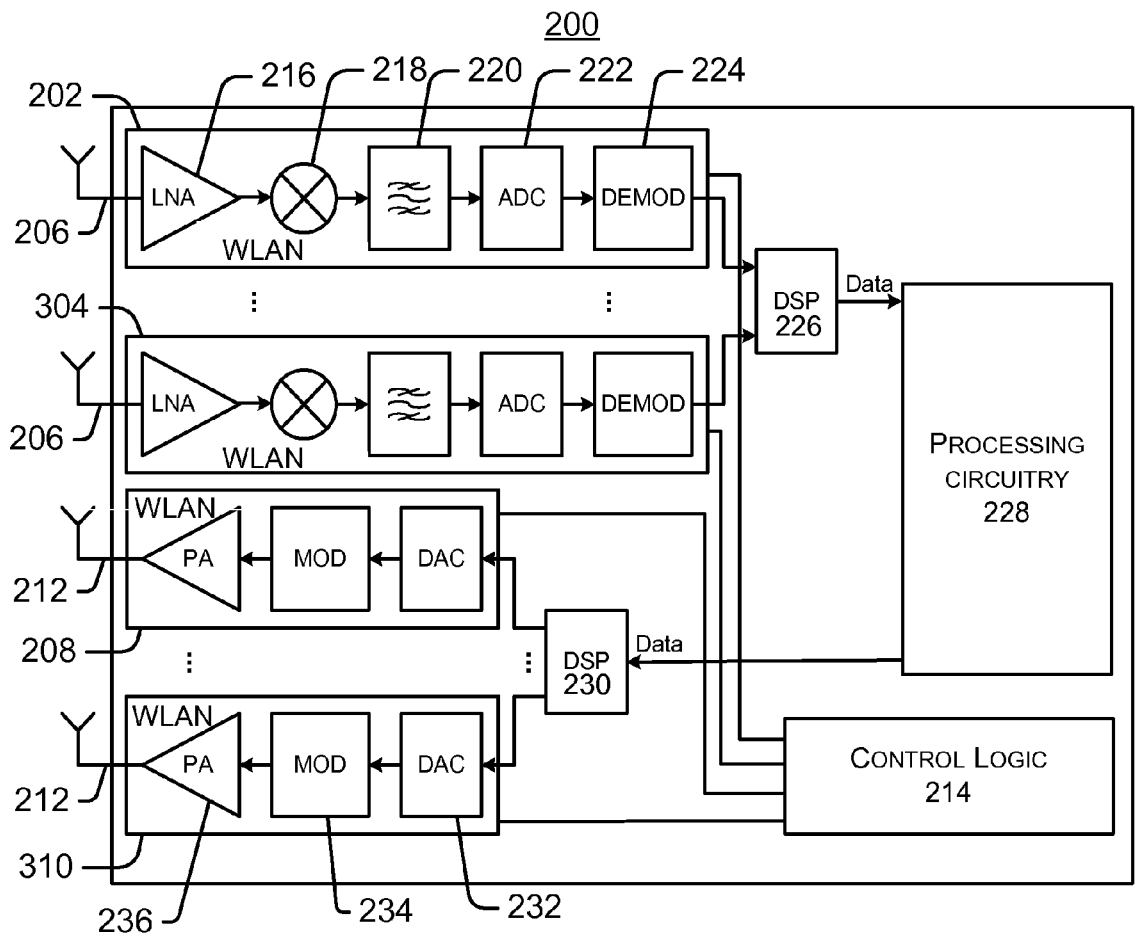
FIG. 3 shows a schematic circuit diagram of the exemplary transceiver system of FIG. 2 being operated in a single mode operation.

FIG. 3 shows a system 200 in which the RX and TX paths have been configured to accommodate a single mode, e.g. WLAN mode, which may be operated using one or more spatial channels with the same frequency. The system 200 may switch to a single WLAN mode due to the BT mode becoming inactive. This may occur due to a user ceasing use of a Bluetooth device or other interruption. The RX path 204 and the TX path 210 may thus be configured by control logic 214 for use as second RX and TX paths for WLAN operation. This allows for an increased rate of data transmission and reception for the WLAN mode.

FIGS. 2 and 3 have been shown and described as having two RX paths and two TX paths. However, it should be understood that additional paths may be included. For example, if the system 200 includes 4 RX paths and 4 TX paths, the system 200 could transmit and receive signals in 4 different modes simultaneous, or in 3 different modes with one of the modes operating in a single or multiple channel configuration, and so forth. Additionally, FIG. 2 shows a SISO configuration for each mode (e.g., WLAN and BT modes each operated on one TX and one RX path), it will be appreciated that the system 200 may be operated with a different mode on the two TX paths (e.g. WLAN and BT modes each operated on one TX and one RX path), but the same mode on the RX paths (e.g. BT mode operated on both RX path), thus operating the system in a multiple input single output (MISO) configuration for the BT. Similarly, the system 200 could be configured in a single input multiple output (SIMO) configuration. The determination over how to configure the paths may be at least in part controlled by a user or may be automatic, such as when a given mode becomes active or inactive.

Exemplary Process

An exemplary process in accordance with the present disclosure will now be described. For simplicity, the process will be described with reference to the exemplary environment 100 and the exemplary system 200 described above with reference to FIGS. 1 through 3.

Figure 4:
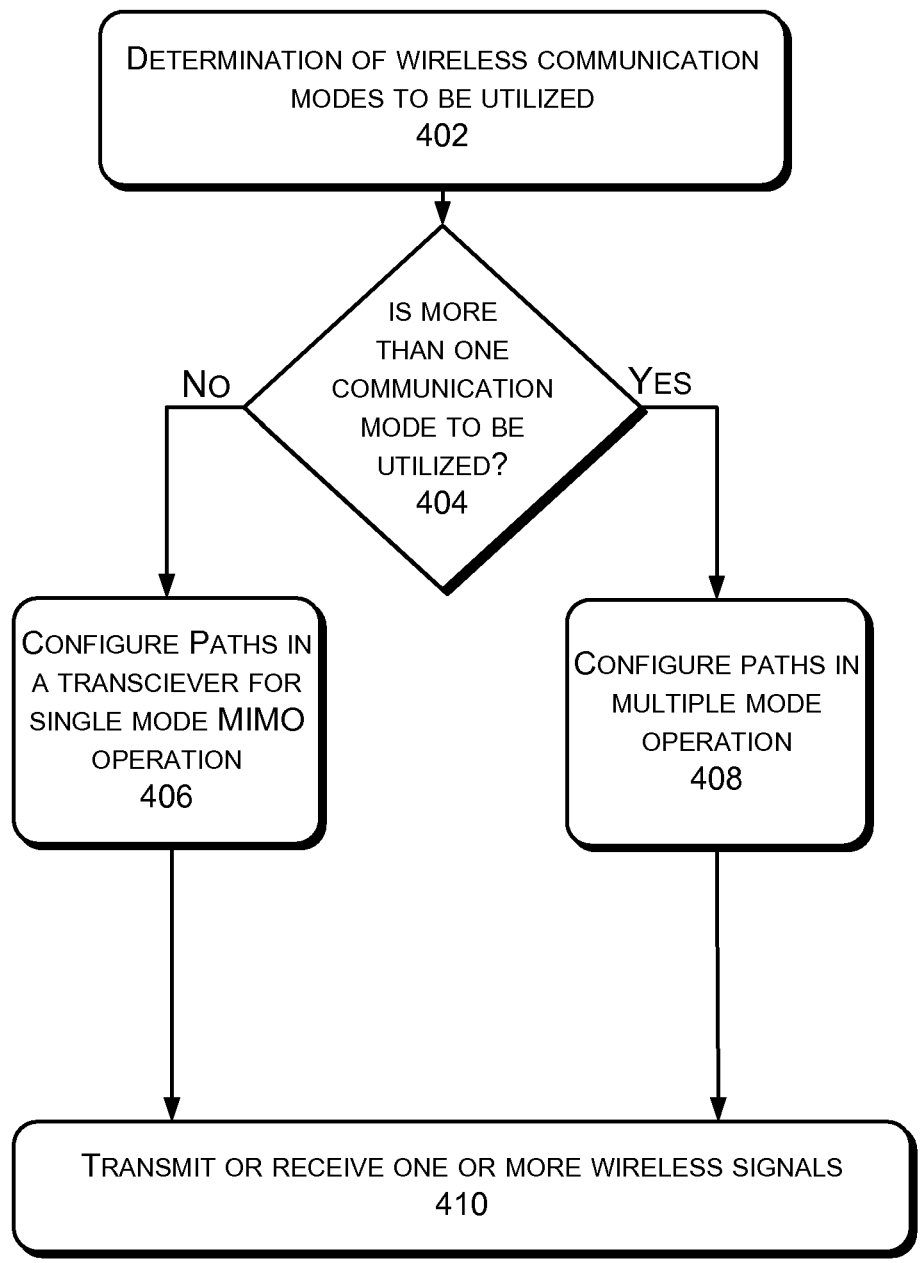
FIG. 4 shows an exemplary method of operating a transceiver system in a single or multiple mode operation.

FIG. 4 shows one example implementation of a process 400 for configuring a transceiver system for multiple mode and/or single mode operation. The method may be implemented utilizing a system 200 as shown in FIGS. 2 and 3 and may be applied to operation of transmitting or receiving signals.

At 402, the wireless communication modes to be utilized may be determined. The determination of modes may be conducted automatically by a device such as wireless device 100 or may be controlled at least in part by a user. For example, the user of a wireless device 100 having a system 200 may be prompted via a user interface to select modes of operation, such as GSM, UMTS, 3GPP LTE, WiMax, WLAN, BT, or other mode. Additionally or alternatively, the modes may be automatically detected by the device 100. The modes may also be determined based on availability and/or user preference.

At 406, if only one communication mode is determined to be utilized (decision box 404), the signal may be received and processed by configuring the transceiver in a MIMO configuration, as shown in FIG. 3. Accordingly, the transceiver may be operated in a single mode operation utilizing one or more spatial channels with the same frequency.

At 408, if more than one mode is to be utilized (decision box 404), the transceiver system may be configured for multiple mode operation. Based on the number of paths available, each path may be configured to transmit or receive a different mode, such as shown in FIG. 2 or, if available, certain paths may be configured to operate in a common mode utilizing one or more spatial channels with the same frequency. Thus, if three receiving paths are available for two modes of operation (e.g. BT and WLAN), one path may be operated in one of the modes and the other two paths may be operated in the other mode.

At 410, the transceiver system transmits or receives wireless signals. The system and or user may reconfigure the paths during operation as necessity or preference dictates.

Although specific details of exemplary methods have been described above, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media can be any available media that can be accessed by a computing device to implement the instructions stored thereon.

Conclusion

For the purposes of this disclosure and the claims that follow, the terms "coupled" and "connected" may have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A device comprising:
a plurality of receiving antenna paths connected to a first digital signal processor, at least a portion of the plurality of receiving antenna paths configurable to operate in a single or multiple mode operation;
a plurality of transmitting antenna paths connected to a second digital signal processor, at least a portion of the plurality of transmitting antenna paths configurable to operate in a single or multiple mode operation;
control logic configured to:
configure the plurality of receiving antenna paths according to a single mode of operation and the plurality of transmitting antenna paths according to different modes of operation; or
configure the plurality of receiving antenna paths according to different modes of operation and the plurality of transmitting antenna paths according to a single mode of operation; and
processing circuitry configured to receive data from the first digital signal processor and to send data to the second digital signal processor,
wherein whether to configure the plurality of receiving antenna paths and the plurality of transmitting antenna paths for single or multiple mode operation is controlled by the control logic based on availability of a given mode.

2. The device according to claim 1, wherein whether to operate in a single or multiple mode operation is controlled at least in part by a user.

3. A system for transmitting and receiving wireless signals, the system comprising:
a first receiver path;
a second receiver path;
a first transmitter path;
a second transmitter path; and
control logic to configure the first receiver path to operate in a first mode, the second receiver path to operate in a second mode, the first transmitter path to operate in a third mode and the second transmitter path to operate in a fourth mode, wherein the first mode, the second mode, or both are the same as the third mode, the fourth mode, or both, and the control logic operable to switch either the first and second receiver paths or the first and second transmitter paths, or both the first and second receiver paths and the first and second transmitter paths between a multiple mode operation and a single mode operation by tuning gain, current characteristics, bandwidth, resolution, or combinations thereof, of components of the first receiver path, the second receiver path, the first transmitter path, the second transmitter path, or combinations thereof, according to bandwidth, compression, and other characteristics of the first mode, the second mode, the third mode, and the fourth mode.

4. The system according to claim 3, wherein the first, second, third, and fourth modes have a mode type, the mode type selected from the group consisting of a Global System for Mobile communications (GSM) mode, a Universal Mobile Telecommunications System (UMTS) mode, a Third Generation Partnership Project Long Term Evolution (3GPP LTE) mode, a Worldwide Interoperability for Microwave Access (WiMax) mode, a Wireless Local Area Network (WLAN) mode, and a Bluetooth (BT) mode.

5. The system according to claim 4, wherein during the single mode operation, the first mode is of the same type as the second mode and the first and second receiver paths are operated at different channels.

6. The system according to claim 4, wherein during the single mode operation, the third mode is of the same mode type as the fourth mode and the first and second transmitter paths are operated at different channels.

7. The system according to claim 4, wherein during the multiple mode operation, the first mode is of a different type than the second mode.

8. The system according to claim 4, wherein during the multiple mode operation, the third mode is of a different type than the fourth mode.

9. The system according to claim 3, wherein the first and second receiver paths and the first and second transmitter paths each comprise multiple components, the control logic being coupled to one or more of the components.

10. The system according to claim 9, wherein the first and second receiver paths each comprise a low noise amplifier component, a mixer component, a filter component, an analog to digital converter component, and a demodulator component, the control logic being coupled to at least one of these components to configure that component for a particular mode.

11. The system according to claim 9, wherein the first and second transmitter path each comprise a digital to analog converter component, a modulator component, and a power amplifier component, the control logic being coupled to at least one of these components to configure that component for a particular mode.

12. A system, comprising:
a first receiver path including a first mixer and a first analog to digital converter;
a second receiver path including a second mixer and a second analog to digital converter;
a first transmitter path;
a second transmitter path; and
control logic to select between:
operating the first receiver path as a first channel of a first communication mode and the second receiver path as a second channel of the first communication mode, and
operating the first receiver path in the first communication mode and the second receiver path in a second communication mode, the second communication mode being different from the first communication mode
wherein the control logic is operable to switch either the first receiver path or the second receiver path between a multiple mode operation and a single mode operation by tuning gain, current characteristics, bandwidth, resolution, or combinations thereof, of components of the first receiver path and the second receiver path, respectively, according to bandwidth, compression, and other characteristics of the first communication mode and the second communication mode, respectively.

13. The system according to claim 12, wherein the first and second communication modes are each selected from the group consisting of a Global System for Mobile communications (GSM) mode, a Universal Mobile Telecommunications System (UMTS) mode, a Third Generation Partnership Project Long Term Evolution (3GPP LTE) mode, a Worldwide Interoperability for Microwave Access (WiMax) mode, a Wireless Local Area Network (WLAN) mode, and a Bluetooth (BT) mode.

14. A system, comprising:
a first receiver path;
a second receiver path;
a first transmitter path including a first digital to analog converter and a first modulator;
a second transmitter path including a second digital to analog converter and a second modulator; and
control logic to select between:
operating both the first transmitter path and the second transmitter path in a first communication mode, and
operating the first transmitter path in the first communication mode and the second transmitter path in a second communication mode, the second communication mode being different from the first communication mode,
wherein the control logic is operable to switch either the first transmitter path or the second transmitter path between a multiple mode operation and a single mode operation by tuning gain, current characteristics, bandwidth, resolution, or combinations thereof, of components of the first transmitter path, the second transmitter path, or combinations thereof, according to bandwidth, compression, and other characteristics of the first communication mode and the second communication mode, respectively.

15. The system according to claim 14, wherein the first and second communication modes are each selected from the group consisting of a Global System for Mobile communications (GSM) mode, a Universal Mobile Telecommunications System (UMTS) mode, a Third Generation Partnership Project Long Term Evolution (3GPP LTE) mode, a Worldwide Interoperability for Microwave Access (WiMax) mode, a Wireless Local Area Network (WLAN) mode, and a Bluetooth (BT) mode.

16. The system according to claim 14, wherein the first mode is a Bluetooth mode and the second mode is a Wireless Local Area Network (WLAN) mode.

17. A method comprising:
determining one or more communication modes to be utilized within a wireless communication environment;
configuring a transceiver system such that a plurality of receiving antenna paths are configured according to a single mode of operation and a plurality of transmitting antenna paths are configured according to a plurality of different modes of operation or the plurality of receiving antenna paths are configured according to a plurality of different modes of operation and the plurality of transmitting antenna paths are configured according to a single mode of operation, wherein the configuring comprises switching either the plurality of receiving antenna paths or the plurality of transmitting antenna paths, or both, between a multiple mode operation and a single mode operation by tuning gain, current characteristics, bandwidth, resolution, or combinations thereof, of components of the plurality of receiving antenna paths, or the plurality of transmitting antenna paths, or combinations thereof, according to bandwidth, compression, and other characteristics of the single mode of operation and the plurality of different modes operation; and
transmitting or receiving one or more wireless signals within the wireless communication environment.

18. The method according to claim 17, wherein if more than one mode is to be utilized, configuring the transceiver system to operate in a multiple mode configuration with at least one of the modes being operated using multiple spatial channels with the same frequency.

19. The method according to claim 17, wherein if only one communication mode is to be utilized, the system is operated in a single mode configuration using multiple spatial channels with the same frequency.

* * * * *